Patented Jan. 7, 1936

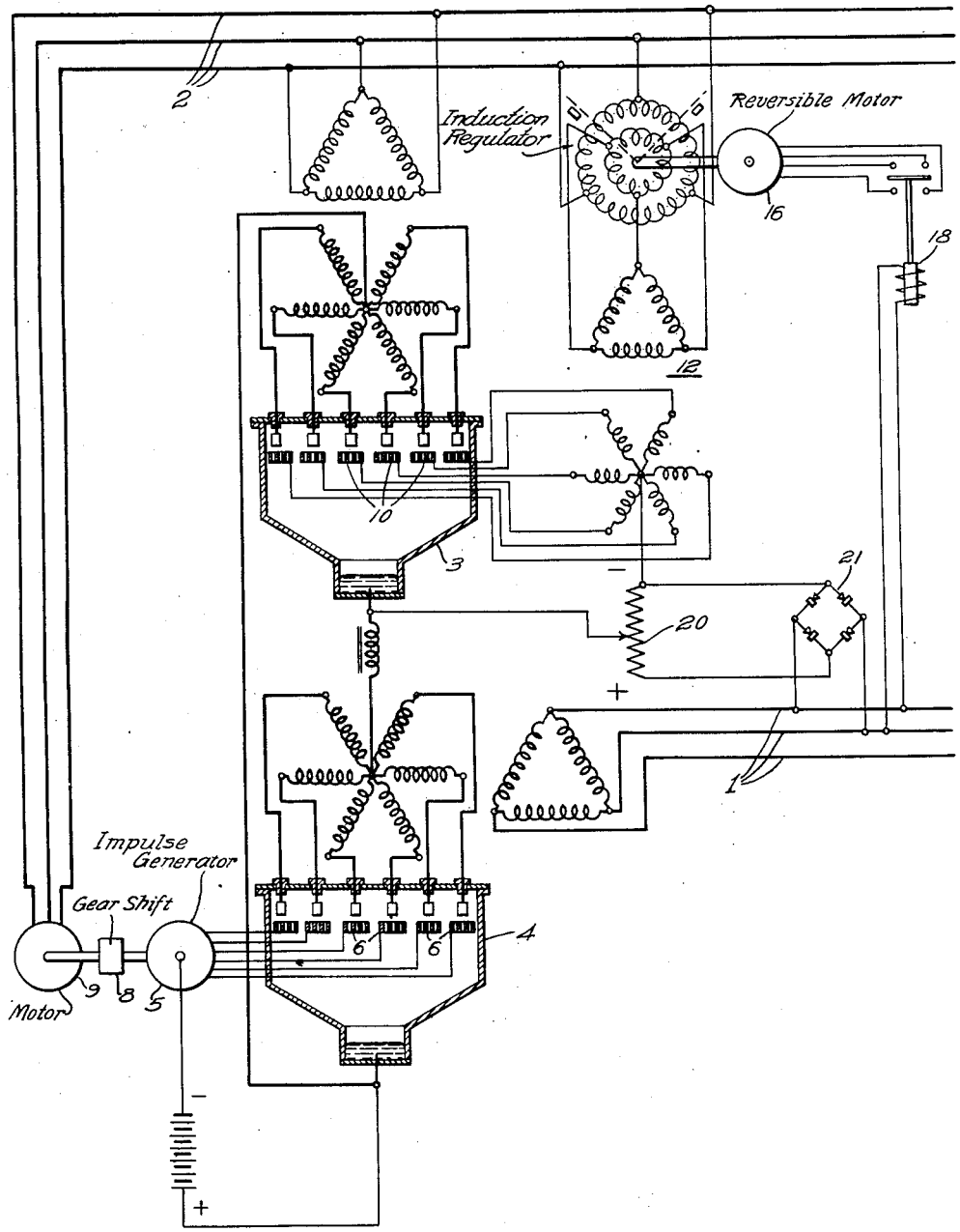

2,027,235

UNITED STATES PATENT OFFICE 2,027,235

VOLTAGE REGULATION INVERTER

Hans Klemperer, New York, N. Y., assignor to Westinghouse Electric & Manufacturing Company, East Pittsburgh, Pa., a corporation of Pennsylvania Application August 17, 1934, Serial No. 740,224
In Germany August 28, 1933

7 Claims. (Cl. 171—97)

My invention relates to a vapor electric converter and particularly to a control system for controlling the voltage of the load circuit of a vapor electric frequency changer.

In the operation of vapor electric frequency changers, it is customary to provide one converter for converting the supply frequency to direct current and a second converter for converting the direct current to alternating current of the desired frequency.

In the operation of such systems, it is necessary to maintain the voltage of the load system substantially constant regardless of the amount of load on the system.

It is accordingly an object of my invention to provide means responsive to the voltage of the load system for controlling the amount of power current transmitted by a vapor electric frequency changing system.

In the apparatus according to my invention, the converter converting the supply frequency to direct current is provided with grid control in such manner that the voltage of the direct current output of the converter is responsive to the alternating current output voltage of the second converter.

Other objects and advantages of my invention will be apparent from the following detailed description taken in conjunction with the accompanying drawing in which The single figure is a schematic illustration of a vapor electric translating system embodying my invention.

An alternating current load circuit 1 is connected to an alternating current supply circuit 2 through a vapor electric conversion system comprising a multi-valve converter 3 for converting the alternating current supply to direct current and a second converter 4 for converting the direct current output of the first converter 3 into alternating current of the desired frequency for the load circuit 1.

Preferably, the second converter 4 is provided with grid control for determining the output frequency of the load circuit 1 independently of the frequency of the supply circuit 2. While any suitable frequency control may be used, I prefer to supply an impulse generator 5 connected to the control electrodes 6 of the converter 4 and to drive this impulse generator 5 at any desired speed by means of a gear shift device 4 interposed between the impulse generator 5 and any suitable constant speed motor 9, such as a synchronous motor driven from the supply line 2.

The converter 3 operating to produce direct current from the supply frequency is provided with suitable control electrodes 10 which are, in turn, supplied from any suitable source such as a transformer 12 connected to the supply source 2. Preferably, the control transformer 12 is provided with phase shift in order to permit control of the output voltage of the converter 3. This control source 12 is further modified by means of a bias voltage variable with the voltage of the alternating current load circuit 1.

While any desired means may be utilized for shifting the phase of the control voltage applied to the electrodes 10, I prefer to provide a rotary phase shift device such as an induction regulator 15 having a stationary primary winding connected to a suitable alternating current source such as the supply line 2 and a rotatable secondary winding connected to the primary of transformer 12 and driven by a reversible motor 16 whose direction of rotation is controlled by a voltage responsive relay 18 connected to the load line 1.

The induction regulator 15 is preferably utilized to shift the phase of the alternating current applied to the transformer 12 and is particularly useful for correcting relatively large voltage variations.

Minor voltage fluctuations are preferably compensated by a bias voltage furnished by a potentiometer 20 supplied with a voltage variable with the voltage of the load circuit 1. The required variable voltage may be conveniently provided by a suitable rectifier 21.

In the operation of the system according to my invention, the control source 12 is adjusted so that the normal direct current voltage produced by the converter 3 will supply the proper voltage for the load circuit 1. Any variation of the voltage of the load circuit 1 will vary the biasing potential applied to the control electrodes 10, for instance, if the voltage of the load circuit 1 should decrease, the biasing potential would also decrease permitting the converter 3 to pick up earlier in the cycle, thereby increasing the direct current output voltage and consequently the voltage applied to the load circuit.

While I have shown and described a specific embodiment of my invention, it will be apparent that changes and modifications can be made therein without departing from the true spirit of the invention or the accompanying claims.

I claim as my invention:

1. An electrical distribution system comprising an alternating current supply circuit, an alternating current load circuit operating at a frequency independent of the frequency of the supply circuit, a group of electric valves connected to the supply circuit, a second group of electric valves serially connected with respect to said first mentioned group of valves, said second group of valves being associated with said load circuit, control electrodes associated with said first group of valves, means for impressing control voltage on said electrode and means responsive to the voltage of the load circuit for varying the voltage supplied to the control electrodes.

2. An electrical distribution system comprising an alternating current supply circuit, an alternating current load circuit operating at a frequency independent of the frequency of the supply circuit, a group of electric valves connected to the supply circuit, a second group of electric valves serially connected with respect to said first mentioned group of valves, said second group of valves being associated with said load circuit, control electrodes associated with said first group of valves, means for impressing control voltage on said electrodes, and a source of biasing voltage variable with the voltage of the load circuit for biasing said control voltage.

3. An electrical translating system comprising a supply circuit, a load circuit, said circuits operating at independent frequencies two series connected valve type converters for transferring energy between said systems and means responsive to the voltage of the load system for controlling one of said converters.

4. An electric translating system comprising an alternating current supply circuit, an alternating current load circuit, a vapor electric converter for transforming electric energy from said supply circuit to direct current, a second vapor electric converter for transforming the direct current energy to alternating current of the frequency of the load circuit and means responsive to the voltage of the load circuit for controlling the direct current voltage produced by said first mentioned converter.

5. An electrical distribution system comprising a pair of alternating current lines operating at independent frequencies, a plurality of electric valves for receiving current from one of said lines and converting the same into direct current, a plurality of valves for receiving said direct current and converting it to alternating current of the frequency of the second line, a direct current circuit interconnecting said converters, control electrodes associated with said first mentioned valves, a source of control potential variable with the voltage of said second line and means for impressing said control potential on said electrodes for varying the voltage of the direct current produced by said valves.

6. A vapor electric frequency changer comprising a vapor electric converter for converting the alternating supply current to direct current, a second vapor electric converter for converting the direct current to alternating current of the frequency of the load circuit, a direct current circuit for transferring energy between said converters and means for controlling the voltage of the direct current in response to the voltage of the load circuit.

7. In a frequency conversion system having an electric valve converter for converting the supply current to direct current, a second electric valve converter supplied from said first-mentioned converter for converting the direct current to alternating current of the frequency of the load circuit, a control system comprising control electrodes for the valves of the first mentioned converter, a source of control potential for said valves, a second source of control potential variable with the voltage of the load circuit and means for superposing said second potential on said first control potential.

HANS KLEMPERER.